Figure 1:
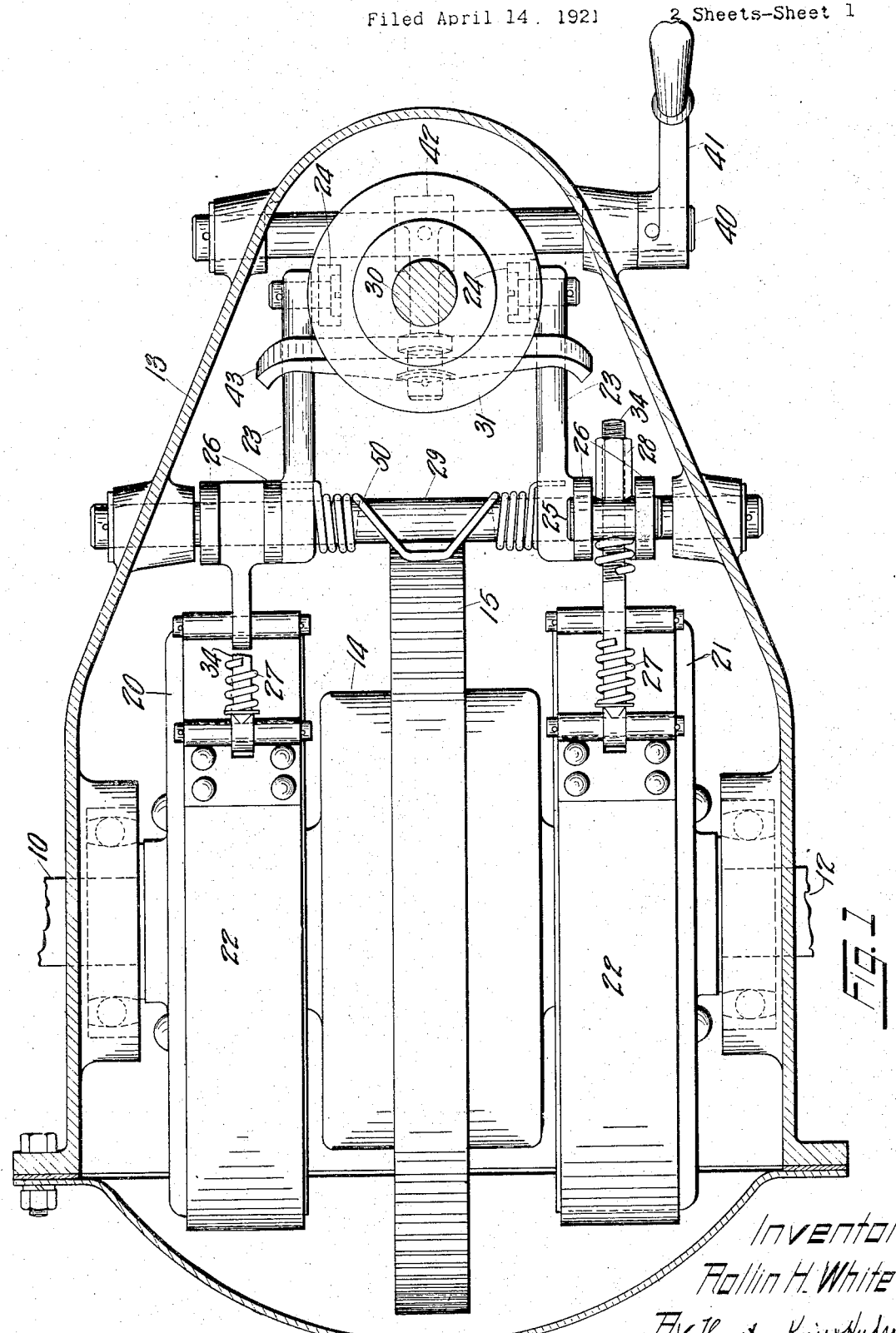

Oct. 21, 1924. 1,512,153
R. H. WHITE
BRAKE MECHANISM
Filed April 14, 1921 2 Sheets-Sheet 1

Inventor
Rollin H. White
By Thurston Kwis Hudson
Attys

Oct. 21, 1924.  
R. H. WHITE  
1,512,153  
BRAKE MECHANISM  
Filed April 14, 1921  
2 Sheets-Sheet 2
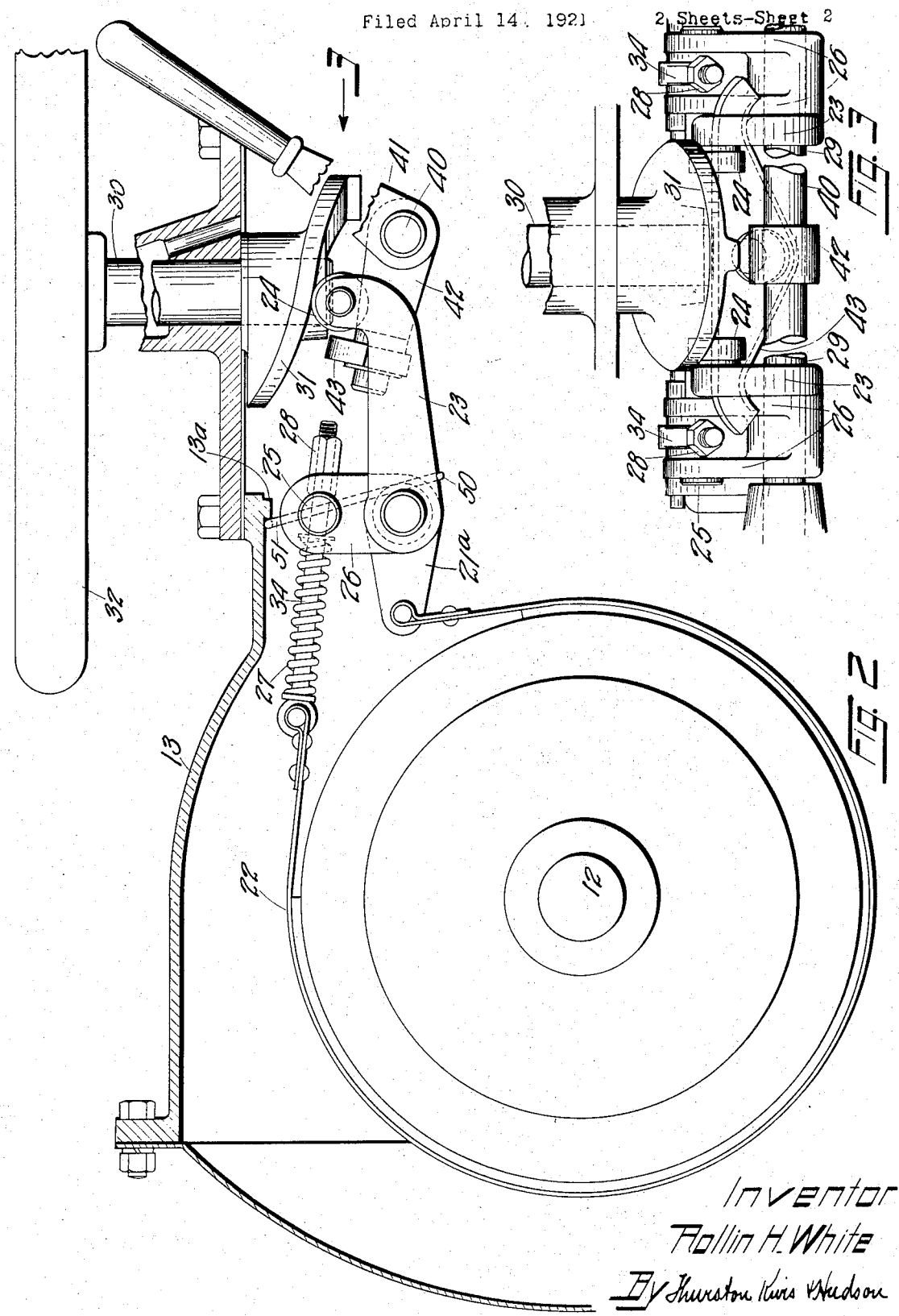
Inventor  
Rollin H. White  
By Thurston Kwis & Hudson  
Attys Patented Oct. 21, 1924.

1,512,153

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

BRAKE MECHANISM.

Application filed April 14, 1921. Serial No. 461,285.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Brake Mechanism, of which the following is a full, clear, and exact description.

It is common practice to provide tractors with two aligned driving axles, and to operatively connect them by differential mechanism. It is likewise common practice, especially in track laying tractors which have two track belts located respectively on opposite sides of the machine, to employ means through which these track belts are respectively actuated by said two driving axles. It is likewise common practice to steer such track laying tractors by producing and controlling a difference in the rates of rotation of the two driving axles, and a consequent difference in the rate of movement of the track belts, and there is at least one tractor on the market in which to produce this controlled differentiated turning of the two driving axles, two brake drums and brake mechanisms are respectively associated with the two driving axles, in such manner that when brakes are selectively applied to these brake drums one or the other of the driving axles is slowed down and the other correspondingly speeded up. Such mechanism in a practically successful form is shown in my prior patent Reissue No. 14,938. In that particular mechanism, as I believe must be the case in all practical mechanisms, a steering wheel is employed, and it is associated with mechanism whereby the turning of the steering wheel in one direction causes a brake to be applied to one brake drum while the turning of the steering wheel in the other direction causes a brake to be applied to the other brake drum.

The object of this invention is to utilize the same brake drums and brake mechanism which are primarily provided for controlling the steering of the tractor, to check or stop the tractor.

The invention consists in the construction and combination of parts which are shown in the drawing and are hereinafter described and are pointed out definitely in the appended claims.

In the drawings, Fig. 1 is plan view of so much of the driving-steering mechanism of the sort described as is necessary to disclose in what manner the present invention may be effectually applied; Fig. 2 is a side elevation of the mechanism, the side of the casing being broken away; and Fig. 3 is a front view of said mechanism.

Referring to the parts by reference characters, 10 and 12 represent respectively the two driving axles, and 14 represents the rotatable differential drum, which, according to common practice, contains suitable differential mechanism through which said axles are driven when the drum is rotated. This drum is, in the example shown, provided with a big spur ring gear 15 by means of which the drum may be rotated.

20 and 21 represent two brake drums which are respectively associated with the axle shafts 10 and 12, and are coaxial therewith. These brake drums may be fixed to the said axles; or, as in the mechanism disclosed in my said prior patent, they may be rotatably mounted on said axles, and may have operative connections with the differential mechanism within the drum. Each of these brake drums is associated with brake mechanism. In the construction shown each brake is in the form of a brake band 22 which embraces the associated drum. One of the ends of each brake band is connected respectively to a pin, which extends between the two arms 21ª and 21ª of one of the bell crank levers 26. The other end of the brake bands 22 are each secured to the eye of a threaded bolt 34 which extends through a pin 25. The pin 25 extends between and is secured to upwardly extending portions of the bell crank levers 26. A coil spring 27 extends around each of the bolts, between their eye and the pin 25, and a nut 28 is screwed on the end of each of the threaded bolts and abuts the pins 25 to adjust the brake bands. By rocking this bell crank lever the brake band is tightened on the drum, or loosened, according to the direction in which the lever is rocked. Each bell crank lever is provided with a forwardly extended lever arm 23 which at its front end supports an anti-friction roller 24 for engagement with the lower face of a cam 31 fixed to the lower end of a suitably mounted rotatable steering post 30, having a steering wheel 32 secured to its upper end. These two lever arms 23 lie on opposite sides of the axis of the steering post, and the two rollers 24 engage the cam 31, equidistant from said axis. In its normal position the operative face of the cam inclines downward equally on opposite sides of its axis, the lowest point of the cam being directly in front of the steering post. Therefore when the steering post is turned in one direction the cam will force one of the levers down and will allow the other lever to move up. The downward movement of the lever moved down will apply its associated brake band as stated, but the upward movement of the lever arm produces no functional effect whatever. A rat trap spring 50 loosely surrounds the non-rotatable shaft 29 on which the two bell crank levers are mounted. The ends of this spring respectively engage the two levers 23 and act to rock said levers in the brake releasing direction,—the middle part of said spring being in the form of an arm 51 which engages a fixed lug 13ª.

40 represents a rock shaft which is mounted in the same casing 13 in which the above described mechanism is enclosed, and projects from one end thereof and is provided with a handle 41 by which it may be rocked. An arm 42 is fixed to this rock shaft and projects rearward, passing beneath the cam 31, and directly below the steering post. To the rear end of this arm a transversely extended equalizer bar 43 is pivoted, which equalizer bar overhangs and maintains substantial engagement with the two brake operating levers 23.

When one desires to stop the tractor by the operation of both brakes the operator taking hold of the handle 41 rocks the rock shaft 40, and thereby causes the equalizer bar 43 to press down upon both of the brake operating levers 23, thereby applying both brakes and with equalized force.

It will be noted that this mechanism for so applying both brakes does not at all interfere with the selective application of the brakes for steering purposes by the described means provided for that purpose, because when the lever 41 is moved back to its normal position the downward movement of either brake lever meets with no interference from the equalizer bar 43. If there is a corresponding upward movement of the other brake lever 23 this movement will rock the equalizer bar freely moving upward the end with which it engages, while the other end will simply follow the other brake lever downward.

Having described my invention, I claim:—

1. In a mechanism of the class described, the combination of two brake drums, a brake-band extending about each of said brake drums, two pivoted bell crank levers each of which is connected to operate one of said brake-bands, a rotatable steering post, a cam secured to rotate with said post and adapted to selectively engage either of said levers to apply one or the other of said brake-bands, means for simultaneously operating said levers, and a lever for moving said means into or out of operative relation with said cam.

2. In mechanism of the character described, the combination of two brake drums, independent brake mechanisms therefor, each including a pivoted brake operating lever, a rotatable steering post carrying a cam which on opposite sides of the axis of the steering post engages respectively with the two brake operating levers, and mechanism by which to simultaneously move both of the brake operating levers in the brake applying direction.

3. In mechanism of the character described, the combination of two brake drums, independent brake mechanisms therefor, each including a pivoted brake operating lever, a rotatable steering post carrying a cam which on opposite sides of the axis of the steering post engages respectively with the two brake operating levers, a rocking lever, an operating handle therefor, and an equalizer bar pivoted to said lever overhanging both of the brake operating levers.

In testimony whereof I hereunto affix my signature.

ROLLIN H. WHITE.